G. HAYES.
Skylights.
No. 5,650.
Reissued Nov. 11, 1873.
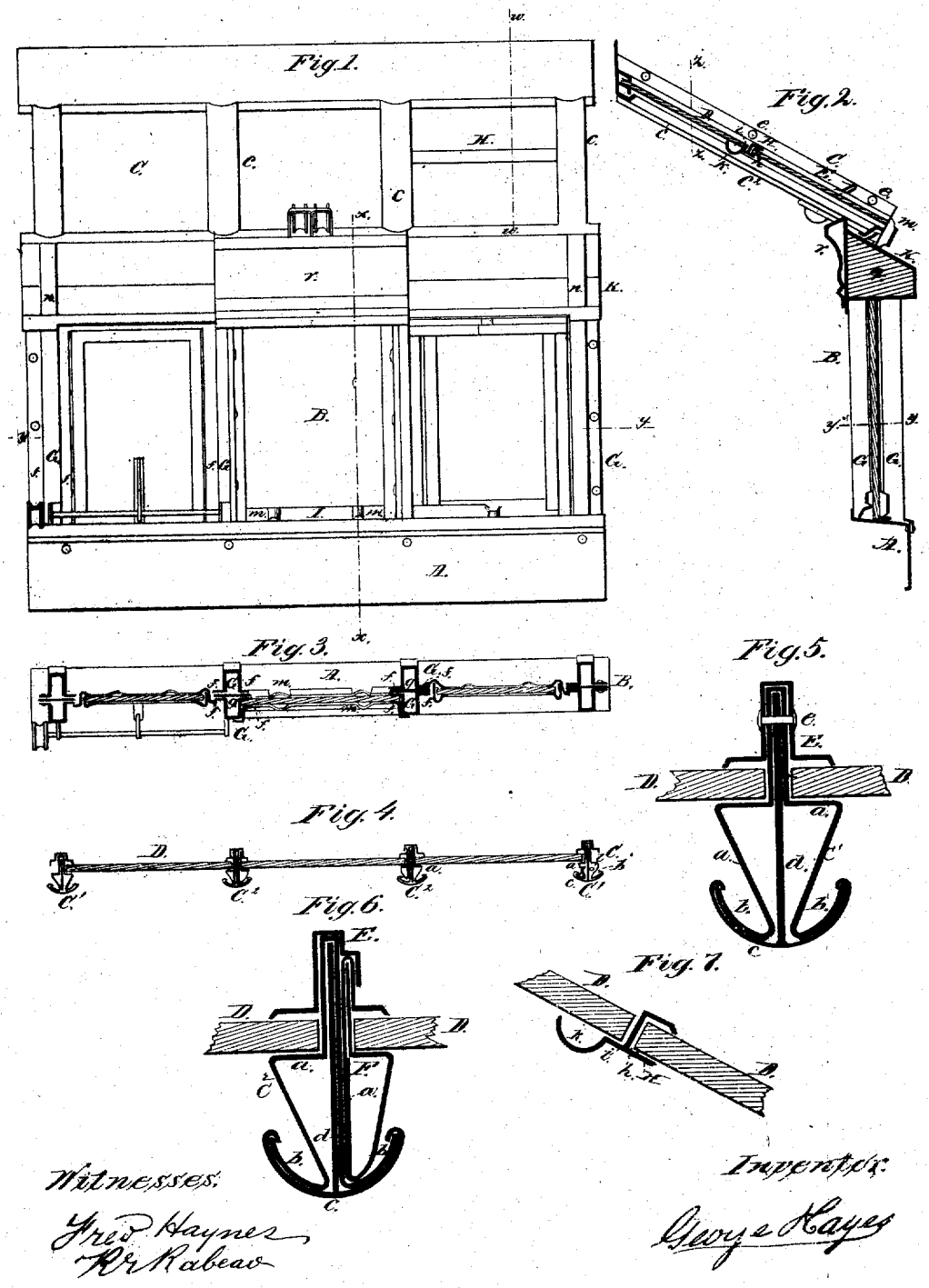
Witnesses:
Fred Haynes
R. Rabeau
Inventor:
George Hayes
NORRIS PETERS, INC. LITHO. WASHINGTON, D. C.

UNITED STATES PATENT OFFICE.

GEORGE HAYES, OF NEW YORK, N. Y.

IMPROVEMENT IN SKYLIGHTS.

Specification forming part of Letters Patent No. 112,594, dated March 14, 1871; reissue No. 5,650, dated November 11, 1873; application filed July 19, 1873.

*To all whom it may concern:*

Be it known that I, GEORGE HAYES, of the city of New York, in the county and State of New York, have invented a new and useful Improvement in Skylights, Conservatories, and other Glazed Structures; and I do hereby declare that the following is a full, clear, and exact description of the same, reference being had to the accompanying drawing, in which—

Figure 1 represents a side elevation, as viewed from the interior, of a conservatory in part constructed in accordance with my invention; Fig. 2, a vertical transverse section of the same through the lines *w w* and *x x* in Fig. 1; Fig. 3, a horizontal section through the lines *y y* in Figs. 1 and 2; Fig. 4, a section taken as denoted by the line *z z* in Fig. 2; Fig. 5, a transverse section, on a larger scale, of one of the roof-bars with cap-plates, showing the same as holding two sheets or panes of glass in between them under a fixed condition of said lights; and Fig. 6, a like view of like parts under a movable or sliding arrangement of one of the lights. Fig. 7 is a view, on an enlarged scale, of the clip for the joints of the glass, as shown in Fig. 2.

Similar letters of reference indicate corresponding parts in all the figures.

While applicable to other glazed structures, it will suffice here to describe the invention as used in the construction of conservatories, which it is desired to build mainly or wholly of glass and metal combined.

Said invention has for its object, or certain of them, the same as those specified for the inventions described in Letters Patent of the United States Nos. 100,143 and 106,157, issued to me on the 22d February and August 9, 1870, namely, provision for expansion and contraction without straining the parts or breakage of the glass, together with lightness and strength, cheapness and expedition of erection, protection against leakage, and provision for carrying off water passing the joints; also, by using galvanized sheet metal, rendering paint unnecessary. Putty to secure the joints of the glass may also, if desired, be avoided; but I do not restrict myself to dispensing with it.

The one part of this invention consists in a novel construction of the roof-bars, applicable not only to conservatories, but also to domes and flat or curved skylights, whereby, while the same or greater advantages are secured, as regards lightness and strength, as are claimed for the bar described in my Letters Patent of February 22, 1870, it is made by the arrangement of the gutters to present less obstruction to the light, and is of a more graceful or ornamental configuration.

In this improved bar the gutters which serve to receive the drainage from opposite sides of the bar are brought into close proximity with each other, or, in other words, the hollow bar is contracted toward its center to form gutters below the supporting-surfaces of the glasses, whereby the width of the bar is not materially or at all increased by reason of the gutters, so that the latter offer little or no obstruction to the light passing through the glasses, and the bar is more symmetrical or lighter in appearance. When it is required to provide for a movable light, then the one-half of said bar is suitably reduced and shaped to accommodate the same.

The invention furthermore embraces a peculiarly-constructed clip for the joints of the glass, the same being formed out of a piece of sheet metal bent to constitute a groove for the lower pane of glass, and a rabbet for the upper one, in a roof or other like structure; also, made to form a gutter which communicates with the gutters of the bars, and serves to carry off condensed vapor or other water that may have found its way beneath the glass. The stop-strips, or pieces against which the panes or sashes rest, I also prefer to construct with corrugations, to provide an escape for both outside or inside collections of water, and to give strength; likewise, the uprights or side posts hereinafter described are of a novel and advantageous construction.

The transom of the structure is of sheet metal, stiffened by cast-iron blocks, and intermediately filled with timber.

Referring to the accompanying drawing, A represents the base portion of one of the sides of a conservatory; B, the glazed side of said structure, and C the one-half or portion of its roof. $C^1$ $C^2$ are the roof-bars or rafters.

These bars may be made, as it may be termed, either single or double, accordingly as they are used for fixed or movable lights. For fixed lights, the bar, as shown by those marked $C^1$, and as more clearly represented in Fig. 5, is formed of a metal plate or body, *a*, bent or shaped to give a broad base immediately below the adjacent panes of glass D D, and which may extend, in the form of a straight hollow leg, up between and above the glass, and which terminates below in reversely-inclined or approximating sides, bent at their extremities to form curved gutters *b b;* and, when extra strength is required to be given to the bar, a stiffening-plate, *d*, may be inserted up its center. E is the cap-plate, bent to incase the projecting portion of the straight leg of the bar, and to rest, by bent edges, on the outer surface of the glass, or to lie in close proximity thereto. The whole, thus fitted, may be secured together by rivets *e*.

For a movable light the bar is slightly modified; but its essential features remain the same, one of the most important of which is the juxtaposition of the gutters *b b* on opposite sides of the bar, and the protection which such a bar affords against obstructing the light, as differently arranged and more widely separated gutters do.

To accommodate a movable light, the bars may be constructed as shown by those marked $C^2$, and represented more clearly in Fig. 6 of the drawing. Under such modification the sheet *a* is only bent to form a base on its one side for the glass, but is otherwise shaped to constitute an upper projecting leg and gutters *b b*, connected beneath by a trough-shaped plate, *c*. The cap-plate E is also differently shaped, and made in sections, the one of which is carried by the sliding sash F.

The uprights or side posts G G are composed of two reversely-arranged trough-shaped bars, with flanges *f f* on opposite sides of their faces, (see more particularly Fig. 3,) said bars lying with their faces one against the other, and being secured together by rivets passing through their flanges, with or without a stiffening-plate, *g*, between the bars. This is a neat and light yet strong construction; and the side flanges of the posts form seats or bearing-surfaces for the sashes. The clips H for the joints, formed by upper and lower adjacent panes D D in the roof, are made, as shown in Figs. 2 and 7, of a piece of sheet metal, bent to form a groove, *h*, for the lower pane of glass, a rabbet, *i*, for the upper one, and a gutter, *k*, which latter communicates with the gutters of the bars, and serves to carry off condensed vapor or any water that may have found its way beneath the glass. The stops, strips, or bars I for the panes or sashes, it is also preferred to construct with corrugations *m*, to provide for escape of inside or outside water, and to give strength. The transoms K of the structure are hollow, and made of sheet metal, stiffened internally by cast-iron blocks *n*, arranged at suitable distances apart, and with an intermediate filling of wood, *q*, the whole being faced internally, if desired, with a plate, *r*, of ornamental configuration. In Fig. 1 only the center portion of the transom is represented as thus filled and faced; but the construction is designed to be similar throughout the entire length of the transom.

What is here claimed, and desired to be secured by Letters Patent, is—

1. The hollow metallic bar or rafter $C^1$ or $C^2$, of a contracted construction toward its center, to form gutters below the supporting-surfaces of the glasses, substantially as specified.

2. The hollow metallic bar or rafter $C^1$ or $C^2$, constructed, substantially as described, of plates *a* and *c*, bent to support or connect each other, and to form gutters *b b*, arranged in juxtaposition to each other, and under cover of the base or bases which support the glass, as herein set forth.

3. The clip H, constructed of sheet metal, bent to form a groove, *h*, a rabbet, *i*, and a gutter, *k*, essentially as and for the purpose described.

4. The transom K, made of sheet metal, with cast-iron blocks *n* and intermediate wooden filling *q*, substantially as specified.

GEORGE HAYES.

Witnesses:
MICHAEL RYAN,
FRED. HAYNES.